United States Patent [19]
Smith

[11] Patent Number: 5,683,104
[45] Date of Patent: Nov. 4, 1997

[54] COMBUSTION MODERATION IN AN AIRBAG INFLATOR

[75] Inventor: Bradley W. Smith, Ogden, Utah

[73] Assignee: Morton International, Inc., Chicago, Ill.

[21] Appl. No.: 620,662

[22] Filed: Mar. 22, 1996

[51] Int. Cl.⁶ ................................................ B60R 21/26
[52] U.S. Cl. ..................... 280/736; 280/741; 102/531
[58] Field of Search .......................... 280/736, 737, 280/741, 742, 740; 102/531, 530, 440; 137/68.13; 222/3

[56] References Cited

U.S. PATENT DOCUMENTS

| | | | |
|---|---|---|---|
| 2,391,865 | 1/1946 | Chandler | 60/256 |
| 2,434,652 | 1/1948 | Hickman | 60/256 |
| 2,995,091 | 8/1961 | Haymes et al. | 60/256 |
| 3,041,835 | 7/1962 | Henderson et al. | 60/256 |
| 3,090,196 | 5/1963 | Brewer | 102/289 |
| 3,105,350 | 10/1963 | Eichenberger | 60/256 |
| 3,226,928 | 1/1966 | Webb et al. | 60/256 |
| 3,286,471 | 11/1966 | Kaplan | 60/256 |
| 3,418,811 | 12/1968 | Caveny et al. | 102/289 |
| 3,636,881 | 1/1972 | Godfrey | 102/290 |
| 3,811,380 | 5/1974 | Glass | 60/256 |
| 4,461,214 | 7/1984 | Black | 102/440 |
| 4,590,860 | 5/1986 | Kromrey | 102/289 |
| 5,012,719 | 5/1991 | Goldstein et al. | 102/531 |
| 5,060,973 | 10/1991 | Giovanetti | 280/736 |
| 5,330,730 | 7/1994 | Brede et al. | 280/736 |
| 5,344,186 | 9/1994 | Bergerson et al. | 280/736 |
| 5,433,476 | 7/1995 | Materna et al. | 280/736 |
| 5,441,302 | 8/1995 | Johnson et al. | 280/736 |
| 5,470,104 | 11/1995 | Smith et al. | 280/737 |
| 5,487,561 | 1/1996 | Mandzy et al. | 280/736 |
| 5,494,312 | 2/1996 | Rink | 280/737 |
| 5,531,473 | 7/1996 | Rink et al. | 280/737 |

Primary Examiner—Brian L. Johnson
Assistant Examiner—Peter C. English
Attorney, Agent, or Firm—Nick C. Kottis; Gerald K. White

[57] ABSTRACT

A device and method are provided for appropriately and desirably moderating the combustion of a fluid fuel and oxidant combination. The combustion rate moderator of the invention is a solid form which includes an array of holes wherein the fluid fuel and oxidant combination is housed and burned.

49 Claims, 3 Drawing Sheets

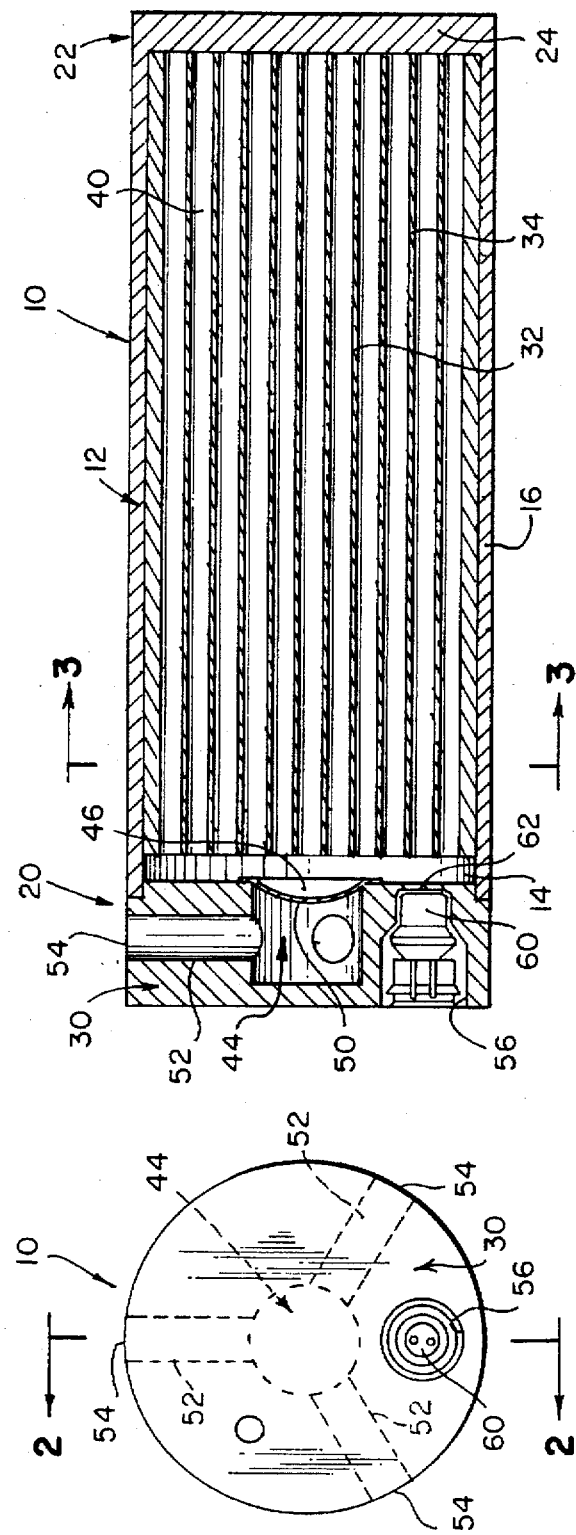
FIG. 2
FIG. 1
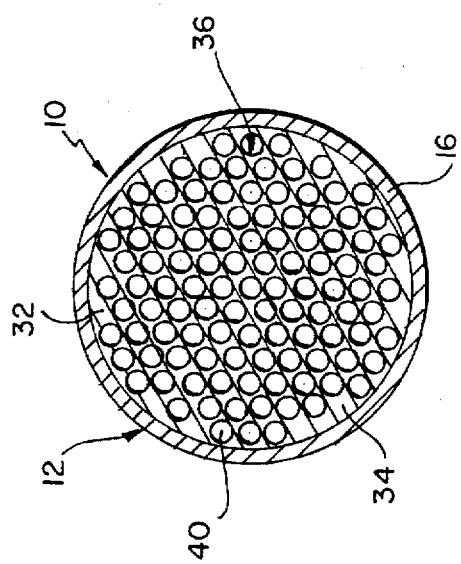
FIG. 3

COMBUSTION MODERATION IN AN AIRBAG INFLATOR

BACKGROUND OF THE INVENTION

This invention relates generally to inflatable restraint systems and, more particularly, to an apparatus and method for inflating an inflatable device such as an inflatable vehicle occupant restraint for use in such systems.

It is well known to protect a vehicle occupant using a cushion or bag, e.g., an "airbag," that is inflated or expanded with gas when the vehicle encounters sudden deceleration, such as in a collision. In such systems, the airbag is normally housed in an uninflated and folded condition to minimize space requirements. Upon actuation of the system, the airbag begins being inflated in a matter of no more than a few milliseconds with gas produced or supplied by a device commonly referred to as a gas generator or "an inflator."

Commonly assigned U.S. Pat. No. 5,470,104, Smith et al., issued Nov. 28, 1995, and U.S. Pat. No. 5,494,312, Rink, issued Feb. 27, 1996, the disclosures of which are fully incorporated herein by reference, disclose a new type of inflator called a "fluid fueled inflator." Such inflator devices utilize a fuel material in the form of a fluid, e.g., in the form of a gas, liquid, finely divided solid, or one or more combinations thereof, in the formation of inflation gas for an airbag. In one such inflator device, a fluid fuel material is burned to produce gas which contacts a quantity of stored pressurized gas to produce inflation gas for use in inflating the respective inflatable device.

U.S. Pat. No. 5,060,973 discloses an occupant restraint system inflator which utilizes a liquid propellant, e.g., a hydroxyl ammonium nitrate-based liquid monopropellant.

U.S. Pat. No. 5,330,730 discloses an airbag gas generator which utilizes a gas-producing liquified gas, e.g., a mixture of one or several short-chain hydrocarbons and nitrogen monoxide ($N_2O$), which is ignitable to generate gas for inflating the airbag.

The combustion rate of various fluid fuel and oxidant combinations can be difficult to predict or control. In particular, gas production via the combustion of fluids in the form of liquids and finely divided solids, wherein gas is produced in general proportion to the fluid surface area, can be especially difficult to predict and control as such fluid materials can assume shapes having various surface areas. For example, turbulence can cause the surface of such liquid fuel and oxidant combinations to become irregular, thereby changing the surface area of the combination; resulting in high, uncontrolled reaction rates which, in turn, can result in undesirably high or uncontrolled gas generation rates and pressures.

In general, airbag inflator combustion of liquid propellant fuel and oxidant combinations have relied on three primary modes of operation.

A first such mode of operation is termed "bulk-loaded ignition." In such mode of operation, a liquid propellant is stored and burned in bulk to produce inflation gas. While an inflator device operated in accordance with such mode of operation can be of relatively simple construction, such operation can produce relatively high gas pressures thereby requiring the device to be of an especially sturdy or heavier weight construction. Further, with such bulk ignition operation, the rate at which gas is produced can be difficult to control and tailor for specific airbag inflation requirements.

A second mode of operation is termed "direct ignition." Such operation is exemplified by U.S. Pat. No. 5,060,973 wherein a liquid propellant is expelled from a storage reservoir through ports into a reaction chamber. Such expulsion of the liquid propellant from the storage reservoir and injection into the reaction chamber is disclosed as being effected by means of the action of a plunger pressurizing the liquid in the storage reservoir.

Such use of and reliance on moving parts for the injection of a liquid propellant can complicate manufacture and operation, as well as make such manufacture and operation more costly.

A third mode of operation is termed "regenerative injection." Such operation is exemplified by the above-identified U.S. Pat. No. 5,330,730 wherein a liquified gas is held in a storage chamber of a housing separated by a partition wall from a combustion chamber also formed in the housing. An ignition device is positioned in a precombustion chamber, and has an ignition charge to generate combustion gases upon ignition. In the precombustion chamber there is guided, in a displaceable manner, a piston which, because of the combustion gases of the ignition charge, moves into and through the combustion chamber in a direction of the partition wall, in order to penetrate the partition wall. When the partition wall is penetrated, there is a connection between the storage chamber and the combustion chamber by way of a liquified gas channel system so that liquified gas can flow into the combustion chamber. At the same time, a connection is created between the precombustion chamber and the (main) combustion chamber by way of ignition channels formed in the piston. The combustion of the liquified gas results in an increase in pressure within the combustion chamber. This results in displacement of the longitudinally displaceable guided partition wall, with the partition wall moving together with the piston to thereby continuously force liquified gas from the storage chamber into the combustion chamber. The combustion gases, in turn, emerge through outlet openings in the housing.

As such operation utilizes a relatively complicated arrangement of moving parts to inject the combustible material into the combustion chamber, the manufacture and operation of a device operated in accordance therewith can be more complicated and costly than desired.

Thus, there is a need and a demand for improvement in airbag inflators to the end of overcoming the foregoing disadvantages. More particularly, there is a need for the provision of an apparatus and method which permits better or more efficient control of the combustion rate of fluid fuel and oxidant combinations in airbag inflator devices.

SUMMARY OF THE INVENTION

A general object of the invention is to provide an apparatus and method which permits better control of the combustion rate of fluid fuel and oxidant combinations, particularly in airbag inflator devices.

A more specific objective of the invention is to overcome one or more of the problems described above.

The general object of the invention can be attained, at least in part, through a combustion rate moderator for use in a gas generating device containing a fluid fuel and oxidant combination. The moderator is a solid form which includes an array of holes wherein the fluid fuel and oxidant combination is housed and burned.

The prior art fails to provide a device of relatively simple construction and having a relatively simple method of operation whereby the reaction rate of fluid fuel and oxidant combinations can be more easily and efficiently controlled and predicted. In particular, the prior art fails to provide an apparatus of relatively simple construction and a relatively simple method of operation which permits better control of the combustion rate of fluid fuel and oxidant combinations in airbag inflator devices.

The invention further comprehends a gas generating apparatus which includes a hollow housing and an initiator device. The hollow housing contains a combustion rate moderator, having a solid form and which includes an array of extending holes wherein is housed a fluid fuel and oxidant combination. The initiator device serves to initiate the combustion of the fluid fuel and oxidant combination housed within the holes of the combustion rate moderator to form gas. The apparatus further includes at least one exit orifice whereby at least a portion of the gas formed upon the combustion of the fluid fuel and oxidant combination is released from the housing.

The invention still further comprehends a method for moderating the combustion of a fluid fuel and oxidant combination in a gas generating device. The method includes the step of burning the fluid fuel and oxidant combination while contained within an array of extending holes of a combustion rate moderator contained within a hollow housing of the gas generating device.

Other objects and advantages will be apparent to those skilled in the art from the following detailed description taken in conjunction with the appended claims and drawings.

BRIEF DESCRIPTION OF THE DRAWINGS

FIG. 1 is a front end view of a gas generating apparatus in accordance with one embodiment of the invention.

FIG. 2 is a simplified, partially in section, schematic drawing of the gas generating apparatus of FIG. 1 taken substantially along the lines 2—2 of FIG. 1.

FIG. 3 is a simplified, sectional schematic drawing of the gas generating apparatus of FIGS. 1 and 2 taken substantially along the lines 3—3 of FIG. 2.

DETAILED DESCRIPTION OF THE INVENTION

Figure 4A:
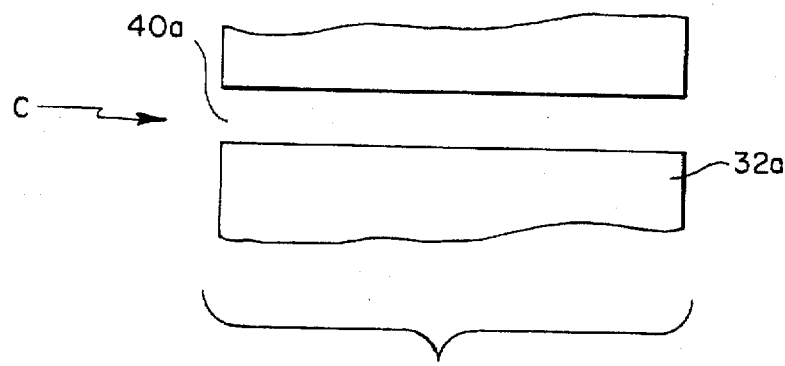
FIGS. 4A, 4B and 4C are enlarged fragmentary cross sectional views of combustion rate moderators in accordance with alternative embodiments of the invention wherein the combustion rate moderator of FIG. 4A has a hole of constant cross sectional area, the combustion rate moderator of FIG. 4B has a hole of increasing cross sectional area, and the combustion rate moderator of FIG. 4C has a hole of decreasing cross sectional area.

Referring initially to FIGS. 1–3, there is illustrated a gas generating apparatus, in accordance with one embodiment of the invention and generally designated by the reference numeral 10. The specifically shown gas generating apparatus 10 is an airbag inflator such as used to inflate an inflatable device such as an airbag (not shown). As will be described in greater detail below, the gas generating apparatus 10 forms gas via the combustion of a selected fluid fuel and oxidant combination. It is to be understood that the invention described hereinafter has general applicability to various types or kinds of airbag assemblies including driver side, passenger side, and side impact airbag assemblies for automotive vehicles including vans, pick-up trucks, and particularly automobiles.

The gas generating apparatus 10 includes a pressure vessel 12 which forms a chamber 14 that contains fuel material and oxidant, particularly a fluid fuel and oxidant combination (e.g., a combination or mixture of fuel and oxidant in the form of a fluid), which burns to form combustion products including at least one gaseous combustion product used to inflate an associated inflatable airbag device (not shown). Thus, the chamber 14 is sometimes referred to herein as a "combustion chamber."

The chamber 14 is defined by an elongated generally cylindrical sleeve 16, having a first end 20 and a second end 22. The second end 22 is closed by means of a base portion 24. As shown, the base portion 24 can desirably be integral (i.e., formed continuous with and in one piece) with the sleeve 16.

The first end 20 is closed by means of a first end closure 30 attached in sealing relation, such as with a weld, crimping or other suitable hermetic seal, therewith.

The combustion chamber 14 forms a hollow housing wherein is housed an elongated generally cylindrical combustion rate moderator 32 which, as shown in FIG. 3, is generally circular in cross section. The combustion rate moderator 32 has a solid form 34 which includes an array 36 (see FIG. 3) of parallel longitudinally extending holes or bores 40 housing the fluid fuel and oxidant combination.

The combustion rate moderator 32 moderates the combustion rate and hence the rate of gas production resulting from the combustion of the fluid fuel and oxidant combination. More specifically and in particular for fluid fuel and oxidant combinations in the form of liquids and finely divided solids, the moderator 32 serves to control the surface area of the fluid undergoing combustion. As the rate at which gas is produced via combustion of such fluid materials is generally proportional to the surface area undergoing combustion, the moderator 32 serves to moderate the combustion rate and hence the rate of gas production resulting from the combustion of such fluid fuel and oxidant combinations.

In a preferred embodiment, such as in order to better ensure control and predictability of the surface area of the fluid combination undergoing combustion, the fluid fuel and oxidant combination substantially completely fills the holes of the moderator.

As shown, the holes 40 are all of the same general preselected length. It is to be understood, however, that a combustion rate moderator in accordance with the invention and having holes or bores of different, preselected lengths can, if desired, be used, for example, to more specifically tailor gas production rates to specific airbag inflation requirements.

As identified above, the invention is particularly suited for use with a fluid fuel and oxidant combination. Fluid materials useable in the practice of the invention include gases, liquids, finely divided solids and various combinations thereof. In general, as fluid materials in the form of liquids and finely divided solids have better defined "surfaces" at which combustion reactions can occur, such fluid forms of fuel and oxidant combinations will be preferred for use in the practice of the invention.

It is further to be understood that the practice of the invention encompasses the use of combinations of fuel and oxidant in the form of a single material, sometimes termed a "monopropellant," such as a hydroxyl ammonium nitrate-based liquid monopropellant. Such propellants are disclosed in the above-identified U.S. Pat. No. 5,060,973, the disclosure of which is herein incorporated.

A particularly suitable liquid propellant composition containing both a fuel material and an oxidant material comprises, by mass, approximately 60% hydroxyl ammonium nitrate as an oxidizer, 20% triethanol ammonium nitrate as a fuel, and 20% water as a solvent.

It is to be appreciated that with a liquid monopropellant such as an aqueous solution of hydroxyl ammonium nitrate and a nitrated hydrocarbon salt, such as triethanol ammonium nitrate, the exothermically generated gases generally consist of nitrogen, carbon dioxide and water vapor, all of which are generally considered nontoxic. Furthermore, the combustion of such a propellant material generally results in no significant particulate by-product and thus preferably renders as unnecessary the post-combustion filtering of the products of combustion.

The combinations of fuel and oxidant in a fluid form useful in the practice of the invention also include mixtures of fuel materials including hydrogen, ammonia, as well as hydrocarbon-based fuels such as hydrocarbon and hydrocarbon derivative fuels, with nitrous oxide ($N_2O$). For example, such hydrocarbon fuels include those constituting cycloparaffinic, olefinic and paraffinic hydrocarbon groups, particularly $C_1$-$C_4$ paraffinic hydrocarbon fuels. In addition, hydrocarbon derivative fuels such as those constituting various alcohols, ethers, and esters, for example, particularly those containing four or fewer carbon atoms and, in particular, alcohols such as ethyl and propyl alcohol can be used.

In addition, a coolant material can be added to such fluid fuel and oxidant combinations and, in particular, to such nitrous oxide-containing fluid fuel and oxidant mixtures if, for example, it is desired to reduce the temperature of the gas resulting from such combustion. Coolant materials which can be added include: inert gases such as xenon, krypton or argon; $CO_2$, and $H_2O$, for example.

Within the first end closure 30 there is contained a diffuser assembly 44. The chamber 14 includes an exit opening 46 which is closed or sealed from the diffuser assembly by sealing means, e.g., by means of a rupture disc 50. The diffuser assembly 44 also includes gas flow channels 52 which place the exit opening 46 in fluid communication with a plurality of exit orifices 54 for dispensing inflation gas from the inflator assembly into an air bag assembly (not shown).

The first end closure 30 also includes an opening 56 therein, wherethrough a suitable initiator device, such as a conventional pyrotechnic initiator 60, is attached in sealing relation within the apparatus assembly 10, as with an O-ring, crimping or other suitable hermetic seal. It is to be appreciated, however, that, if desired, other suitable types of initiator devices including, for example, spark discharge, heated element, semiconductor bridge, printed circuit board, thin film deposition bridge, exploding bridgewire and exploding foil initiators, can be used.

In operation, such as upon the sensing of a collision, an electrical signal is sent to the initiator device 60. The initiator device will produce hot combustion products which will pierce a thin initiator cover 62 formed as a part of the end closure 30 and ignite the fluid fuel and oxidant combination which substantially completely fills the holes 40 of the moderator 32. Within moderator holes 40, the fluid fuel and oxidant combination will burn to result in a rapid pressure rise within the combustion chamber 14. When the gas pressure within the combustion chamber 14 exceeds the structural capability of the rupture disc 50, the disc ruptures or otherwise permits the passage of the hot gas through the gas exit opening 46, the gas flow channels 52 and the exit orifices 54 to be dispensed into an air bag assembly.

As discussed above, the combustion rate moderator 32 serves to moderate the combustion rate and hence the rate of gas production resulting from the combustion of the fluid fuel and oxidant combination. For a moderator having uniformly sized and shaped holes, the total number of holes in the moderator which are filled with the fluid fuel and oxidant combination multiplied by the cross sectional area of one such hole will equal the total surface area of the fluid combination burning at any one moment in time during operation of the inflator. Thus, assuming all else remains the same, increasing the number or area of the holes filled with a fuel and oxidant combination will increase the rate of mass released by the burning of the fuel and hence the rate of gas production, while decreasing the number or area of the holes filled with a fuel and oxidant combination will correspondingly decrease the rate of mass released by the burning of the fuel and hence the rate of gas production.

It will be appreciated that for any particular hole filled with the combination of fuel and oxidant, the length of time during which the combination burns will equal the surface burn rate of the combination multiplied by the depth or length of the hole. Thus, the duration of the combustion reaction can be controlled through the proper selection of the length of the holes in the moderator which are filled with the fuel and oxidant combination. For example, assuming all else remains the same, the greater the length of the moderator hole filled with the fuel and oxidant combination, the longer the combustion reaction will occur, while lesser length combination-filled moderator holes will correspondingly result in a shorter period of time during which the combustion reaction will occur.

It will be appreciated that, in general in order to permit proper functioning of the moderator (i.e., for the moderator to be effective in moderation or control of the combustion rate of the fluid fuel and oxidant combination), the minimum moderator hole size effective for a particular fluid combination of fuel and oxidant will be related to the quenching distance for that particular combination, where the quenching distance is the minimum distance at which heat loss due to conduction through the fluid to the surrounding structures becomes sufficiently significant so that the combustion reaction is no longer sustainable.

In turn, the maximum hole size (i.e., diameter) for a given fluid fuel and oxidant combination will preferably be selected so that turbulence will not result in the fluid combination burning over a surface area significantly larger than the cross sectional area of the hole. That is, the combustion of fuel and oxidant combination housed within the combustion moderator holes will remain essentially linear in progression through a selected hole.

It will further be appreciated that such a solid form of moderator, being generally circular in cross section and including an array of parallel longitudinally extending holes, is well suited for formation via extrusion fabrication. In particular, preferred forms of such moderators include extruded aluminum and extruded ceramic.

Figure 4B:
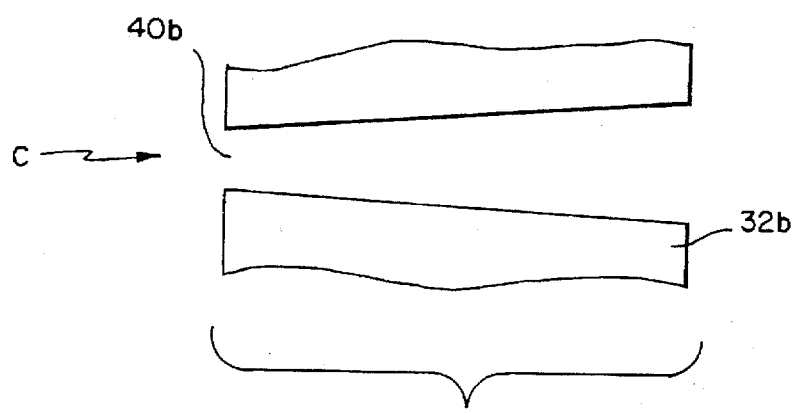
Figure 4C:
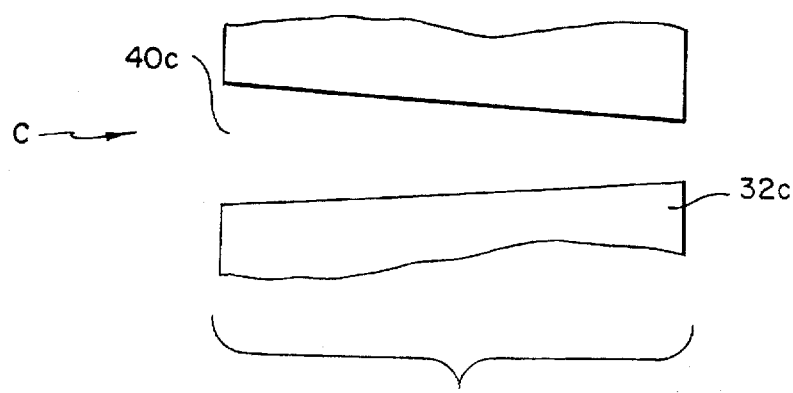

While the invention has been described above relative to a combustion rate moderator having uniformly sized and shaped holes which are filled with a selected fluid fuel and oxidant combination, it is to be understood that the invention is not so limited. For example, if desired, rather than having holes of relatively constant cross sectional area, a combustion rate moderator in accordance with the invention can include holes of increasing or decreasing cross sectional area, as desired. FIG. 4A shows a combustion rate moderator 32a having a hole 40a of constant cross sectional area. FIG. 4B shows a combustion rate moderator 32b having a hole 40b of increasing cross sectional area and FIG. 4C shows a combustion rate moderator 32c having a hole 40c of decreasing cross sectional area, respectively, in terms of the linear direction of combustion, signified in each case by the arrow "C."

Additionally, while the invention has been described above relative to a gas generating apparatus, e.g., an airbag inflator, having a combustion moderator having an array of longitudinally extending holes containing a fluid combination of fuel and oxidant (such as shown in FIGS. 1–3), it is to be understood that the invention is not so limited.

Figure 6:
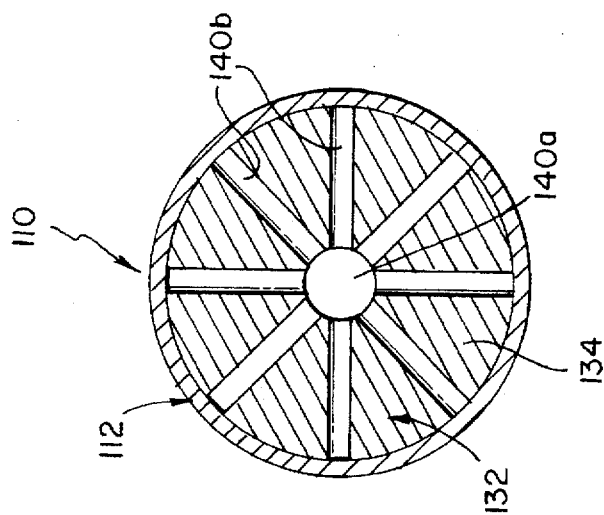
FIG. 6 is a simplified, sectional schematic drawing of the gas generating apparatus of FIG. 5 taken substantially along the lines 6—6 of FIG. 5.
Figure 5:
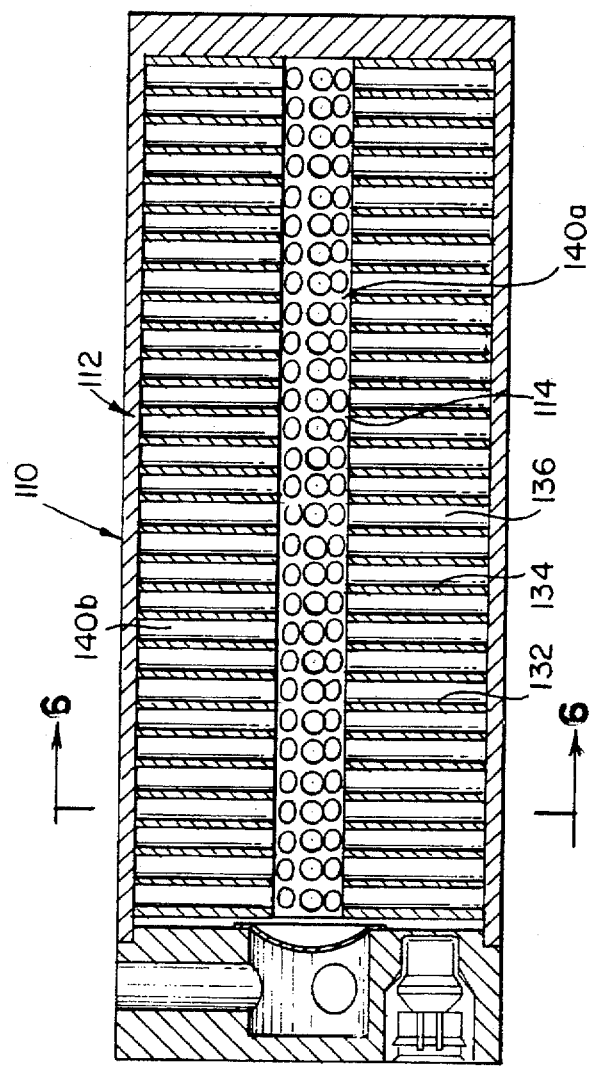
FIG. 5 is a simplified, partially in section, schematic drawing, similar to that shown in FIG. 2, of a gas generating apparatus in accordance with an alternative embodiment of the invention.

For example, FIGS. 5 and 6 illustrate an airbag gas generating apparatus 110 generally similar to the gas generating apparatus 10 of FIGS. 1–3. Specifically, the apparatus 110 includes a pressure vessel 112 which forms a chamber 114. The chamber 114 contains a fluid fuel and oxidant combination, such as described above, which burns to form combustion products including at least one gaseous combustion product used to inflate an associated inflatable airbag device (not shown).

Within the combustion chamber 114 there is housed an elongated generally cylindrical combustion rate moderator 132 having a generally circular cross section. The combustion rate moderator 132 has a solid form 134 which includes an array 136 of holes or bores including a central passage channel 140a as well as a set of holes 140b radially extending therefrom.

The invention illustratively disclosed herein suitably may be practiced in the absence of any element, part, step, component, or ingredient which is not specifically disclosed herein.

It is to be understood that the discussions herein of theory, such as those relating to the effects of turbulence on the burn rate of fluids and how and why the moderator of the invention serves to moderate combustion, are included to assist in the understanding of the subject invention and are in no way limiting on the invention in its broad application.

The foregoing detailed description is given for clearness of understanding only, and no unnecessary limitations are to be understood therefrom, as modifications within the scope of the invention will be obvious to those skilled in the art.

What is claimed is:

1. A gas generating device containing a fluid fuel and oxidant combination and housing a combustion rate moderator, said moderator comprising:
   a solid form which includes an array of holes wherein the fluid fuel and oxidant combination is housed and burned within said holes.

2. The gas generating device of claim 1 wherein the fluid fuel and oxidant combination comprises a fluid monopropellant.

3. The gas generating device of claim 2 wherein the fluid monopropellant is at least partially liquid.

4. The gas generating device of claim 2 wherein the fluid monopropellant comprises an aqueous solution of hydroxyl ammonium nitrate.

5. The gas generating device of claim 2 wherein the fluid monopropellant comprises an aqueous solution of triethanol ammonium nitrate.

6. The gas generating device of claim 2 wherein the fluid monopropellant is at least partially gaseous.

7. The gas generating device of claim 1 wherein the fluid fuel and oxidant combination comprises a finely divided solid mixture of fuel and oxidizer.

8. The gas generating device of claim 1 wherein the fluid fuel and oxidant combination comprises nitrous oxide.

9. The gas generating device of claim 1 wherein with the fluid fuel and oxidant combination there is included a coolant.

10. The gas generating device of claim 9 wherein the coolant is carbon dioxide.

11. The gas generating device of claim 1 wherein the fluid fuel and oxidant combination substantially fills the holes.

12. The gas generating device of claim 1 wherein the moderator is elongated and includes at least one longitudinally extending hole.

13. The gas generating device of claim 12 wherein the array of holes includes a plurality of parallel longitudinally extending holes.

14. The gas generating device of claim 1 wherein said combustion rate moderator is formed via extrusion fabrication.

15. The gas generating device of claim 14 wherein said combustion rate moderator is formed from aluminum.

16. The gas generating device of claim 14 wherein said combustion rate moderator is formed from ceramic.

17. The gas generating device of claim 1 wherein said combustion rate moderator remains intact while the fluid fuel and oxidant combination is burned.

18. An airbag inflator gas generating device containing a fluid fuel and oxidant combination and housing a combustion rate moderator comprising:
   a solid form which includes an array of holes wherein the fluid fuel and oxidant combination is housed and burned.

19. A gas generating apparatus comprising:
   a hollow housing containing a combustion rate moderator having a solid form which includes an array of extending holes wherein is housed a fluid fuel and oxidant combination;
   an initiator device to initiate the combustion of the fluid fuel and oxidant combination housed within the holes of the combustion rate moderator, the fluid fuel and oxidant being burned within the holes to form gas; and
   at least one exit orifice whereby at least a portion of the gas formed upon the combustion of the fluid fuel and oxidant combination is released from said housing.

20. An airbag inflator comprising the gas generating apparatus of claim 19 wherein at least a portion of the gas formed upon the combustion of the fluid fuel and oxidant combination is released from said housing through said at least one exit orifice to inflate an airbag.

21. The gas generating apparatus of claim 19 wherein the fluid fuel and oxidant combination comprises a fluid monopropellant.

22. The gas generating apparatus of claim 21 wherein the fluid monopropellant is at least partially liquid.

23. The gas generating apparatus of claim 21 wherein the fluid monopropellant comprises an aqueous solution of hydroxyl ammonium nitrate.

24. The gas generating apparatus of claim 21 wherein the fluid monopropellant comprises an aqueous solution of triethanol ammonium nitrate.

25. The gas generating apparatus of claim 21 wherein the fluid monopropellant is at least partially gaseous.

26. The gas generating apparatus of claim 19 wherein the fluid fuel and oxidant combination comprises a finely divided solid mixture of fuel and oxidizer.

27. The gas generating apparatus of claim 19 wherein the fluid fuel and oxidant combination comprises nitrous oxide.

28. The gas generating apparatus of claim 19 wherein with the fluid fuel and oxidant combination there is included a coolant.

29. The gas generating apparatus of claim 28 wherein the coolant is carbon dioxide.

30. The gas generating apparatus of claim 20 wherein the fluid fuel and oxidant combination substantially fills the holes.

31. The gas generating apparatus of claim 20 wherein the moderator is elongated and includes at least one longitudinally extending hole.

32. The gas generating apparatus of claim 31 wherein the array of holes includes a plurality of parallel longitudinally extending holes.

33. The gas generating apparatus of claim 19 wherein the combustion rate moderator is formed via extrusion fabrication.

34. The gas generating apparatus of claim 33 wherein the combustion rate moderator is formed from aluminum.

35. The gas generating apparatus of claim 33 wherein the combustion rate moderator is formed from ceramic.

36. The gas generating apparatus of claim 19 wherein the moderator remains intact while the fluid fuel and oxidant combination is burned.

37. A method for moderating the combustion of a fluid fuel and oxidant combination in a gas generating device, said method comprising the step of:

burning the fluid fuel and oxidant combination while contained within an array of extending holes of a combustion rate moderator contained within a hollow housing of the gas generating device.

38. The method of claim 37 wherein the gas generating device is an airbag inflator.

39. The method of claim 37 wherein the fluid fuel and oxidant combination comprises a fluid monopropellant.

40. The method of claim 39 wherein the fluid monopropellant is at least partially liquid.

41. The method of claim 39 wherein the fluid monopropellant comprises an aqueous solution of hydroxyl ammonium nitrate.

42. The method of claim 39 wherein the fluid monopropellant comprises an aqueous solution of triethanol ammonium nitrate.

43. The method of claim 39 wherein the fluid monopropellant is at least partially gaseous.

44. The method of claim 37 wherein the fluid fuel and oxidant combination comprises a finely divided solid mixture of fuel and oxidizer.

45. The method of claim 37 wherein the fluid fuel and oxidant combination comprises nitrous oxide.

46. The method of claim 37 wherein a coolant is included with the fluid fuel and oxidant combination to cool the products of the combustion of the fluid fuel and oxidant combination.

47. The method of claim 46 wherein the coolant is carbon dioxide.

48. The method of claim 37 wherein the fluid fuel and oxidant combination substantially fills the holes.

49. The method of claim 37 wherein the moderator remains intact while the fluid fuel and oxidant combination is burned.

* * * * *